United States Patent Office 3,302,093
Patented Jan. 31, 1967

3,302,093
ELECTRIC FREQUENCY CHANGERS
Christopher John Yarrow, Bradford, England, assignor to The English Electric Company Limited, London, England, a British company
Filed Sept. 16, 1963, Ser. No. 308,996
Claims priority, application Great Britain, Sept. 19, 1962, 35,650/62
11 Claims. (Cl. 321—7)

This invention relates to frequency changers for providing an alternating current output from a polyphase alternating current source.

According to the invention there is provided a frequency changer for providing an alternating current output from a polyphase alternating current source comprising, for each output phase of the frequency changer, switching means for connection between each phase of the polyphase source and a load, control means for cyclically rendering the switching means temporarily conducting in a predetermined order and at a predetermined frequency, and blocking means responsive to the flow of current through any switching means rendered conductive for rendering non-conductive the switching means previously rendered conductive.

According to one aspect of the invention each switching means comprises a pair of controllable rectifiers.

With this arrangement of a pair of controllable rectifiers the blocking means includes, for each pair of such rectifiers, magnetically interlinked inductor means connected to form a bridge circuit in which two adjacent arms of the bridge circuit are formed by the inductor means and the other two arms formed by the pair of controllable rectifiers, and including a capacitor connected between the junction of the two bridge arms which include the controllable rectifiers and the diagonally opposite junction of the bridge.

According to another aspect of the invention each switching means comprises a rectifier bridge two diagonally opposite junctions of the arms of which are for connection between the source and the load and a controllable rectifier connected across the other two diagonally opposite junctions of the arms of the rectifier bridge.

With this arrangement of rectifier bridge switching means the blocking means includes inductor means having a winding for each rectifier bridge connected across the said other two diagonally opposite junctions of its associated rectifier bridge in series with a capacitor.

A frequency changer in accordance with the invention can be arranged to provide a single phase output from a polyphase source or it can be arranged to provide a polyphase output from such source.

Figure 1:
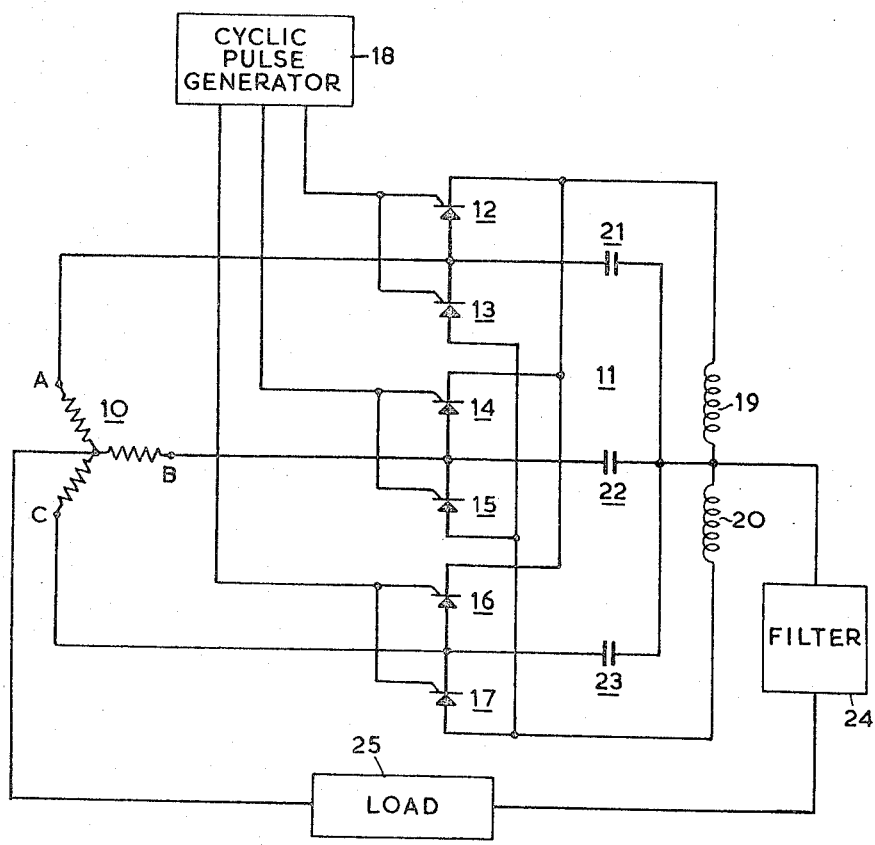
Figure 2:
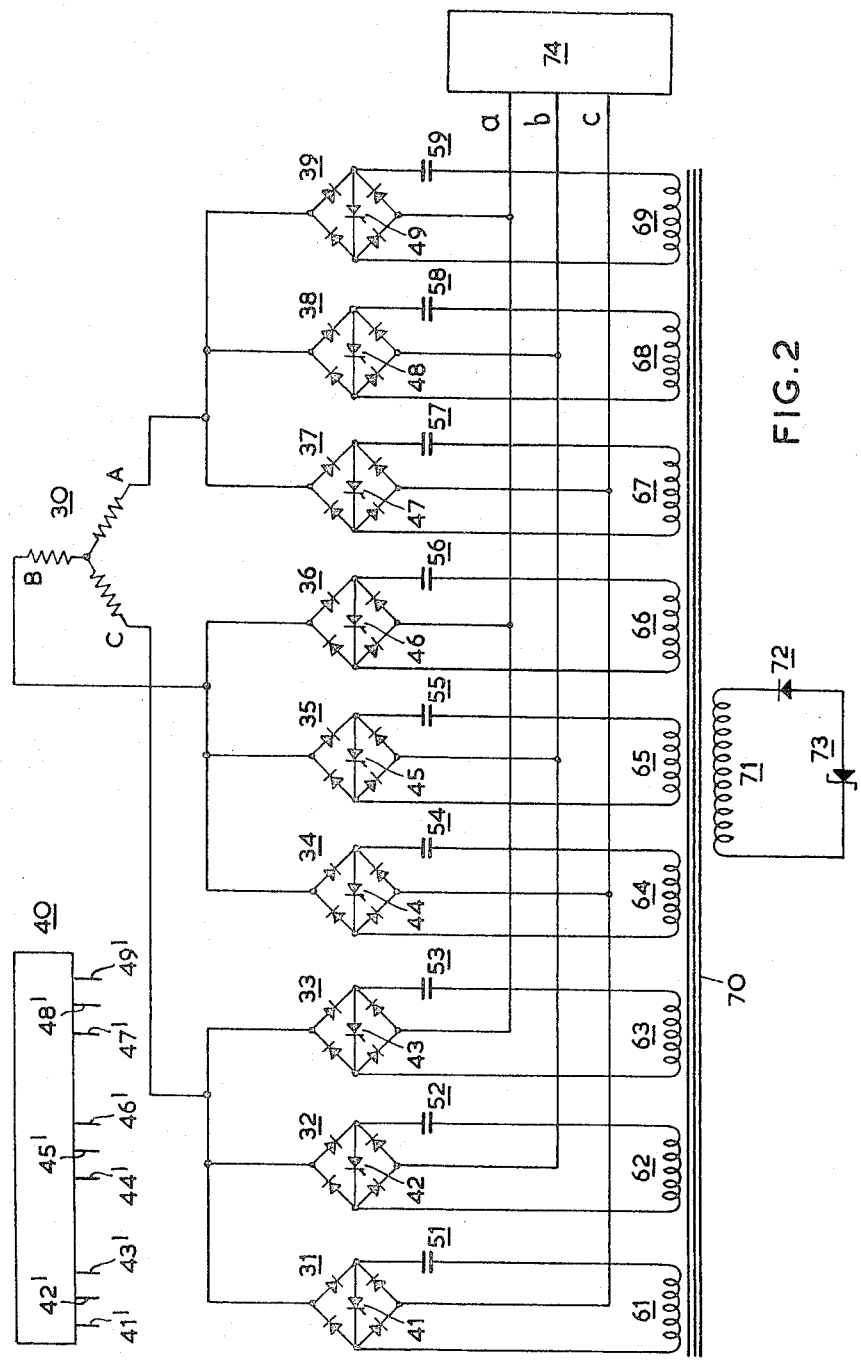

Two frequency changers according to the invention will now be described, by way of example, with reference to the accompanying drawings in which:

FIG. 1 shows the principal details of a frequency changer circuit connected between a three-phase source of alternating current and a single phase load, and FIG. 2 shows the principal details of a frequency changer circuit connected between a three-phase source of alternating current and a three-phase load.

In FIG. 1 there is shown a three-phase star connected alternating current power source 10 connected to the frequency changer generally indicated at 11.

The frequency changer includes six silicon controlled rectifiers 12 to 17 which are controlled so as to be cyclically rendered conductive in pairs 12 and 13; 14 and 15; and 16 and 17 by gating pulses from a cyclically operating pulse generator 18. Two inductors 19 and 20 which are magnetically linked are connected so as to form three bridge circuits with the controlled rectifiers, each bridge circuit being constituted by a pair of rectifiers forming one pair of adjacent arms and the two inductors forming the other pair of adjacent arms which are thus common to each bridge circuit. Capacitors 21, 22 and 23 are respectively connected between the junction of the two inductors and the three junctions respectively of the pairs of rectifiers 12 and 13, 14 and 15, and 16 and 17. These three junctions are also connected to the output terminals of the source 10.

The output of the frequency changer is taken from the junction of the two inductors and the star point of the source 10 to supply a load 25, and a filter 24 is included in the output circuit for smoothing out unwanted harmonics.

In operation the source 10 has a frequency of P cycles per second and the cyclic pulse generator a frequncy of Q complete cycles per second. Thus each pair of controlled rectifiers is rendered conductive for a period equal to $P/nQ$ of a period equal to a cycle of the source where $n$ is the number of input phases (in this frequency changer $n$ equals three), and an alternating current output with a fundamental frequency which is equal to the difference between P and Q is obtained from the frequency changer. The method of rendering the controlled rectifiers non-conducting once they are conducting is described later.

When cyclically switching from one pair of controlled rectifiers to the next pair the pulse generator 18 removes the gating pulse from the first pair and provides a gating pulse for the next pair. At the moment of switching only one of the rectifiers of the first pair will be conducting current from the source and this current must be brought to zero so as to open the circuit through that rectifier and render it non-conducting. This current will be reduced when the values of the voltages in the two phases supplying the two pairs of rectifiers is such that a reverse voltage is directly applied to the rectifier, and the circuit through the rectifier is opened. For example, if the switching occurs when both A and B phase have a positive voltage and phase B voltage is greater than phase A voltage, the rectifier 12 will conduct until rectifiers 14 and 15 are gated and a reverse voltage is applied across rectifier 12 opening the circuit through that rectifier.

However, if for example, switching occurs at an instant to cause rectifier 12 to conduct in its forward direction on phase A when rectifier 17 is conducting on phase C a connection is established between phases A and C through these two rectifiers and the two inductors 19 and 20. Without the two inductors and the capacitors this connection between phases A and C would establish a short circuit between these phases and in addition the rectifier 17 would not be rendered non-conductive. However, current flowing through rectifier 12 and inductor 19 induces in the inductor 20 a reverse voltage which is applied across the rectifier 17 through the capacitor 23 to render the rectifier 17 non-conductive. Reference to the drawing will show that under any conditions that tend to establish a short circuit between phases, one inductor will induce a reverse voltage across the other inductor which reverse voltage is applied through the appropriate capacitor to render non-conductive any rectifier which is conducting, but which is not at the time gated to conductivity.

The gating pulse to the rectifiers associated with a phase must be applied the whole time that that phase is required to supply current as the polarity of the phase voltage may change during that time and the other rectifier connected to that phase must start to conduct.

In an alternative arrangement each bridge circuit has a separate pair of inductors which are suitably interlinked with one another.

Whilst the invention has been described in relation to an arrangement in which the two inductors are common to the three bridge circuits it is possible to use a separate pair of inductors for each bridge circuit providing all such inductors are suitably magnetically interlinked.

It is possible too to combine several frequency changers to produce a polyphase alternating current output with as many phases as frequency changers, and in such cases it is preferable to interlink the inductors magnetically.

Such a frequency changer for supplying a three-phase load from a three-phase source of alternating current is shown in FIG. 2.

In FIG. 2 there is shown a three-phase star-connected alternating current power source generally indicated at 30.

The frequency changer comprises three rectifier bridges 31, 32 and 33 connected to phase C of the source 30 and similar rectifier bridges 34, 35 and 36, and 37, 38 and 39 connected to phases B and A respectively of the source 30.

Each rectifier bridge 31 to 39 includes an associated controllable rectifier 41 to 49 connected across two diagonally opposite junctions of the bridge and the control electrode of each controllable rectifier is arranged to render the rectifier conductive by firing pulses delivered from a cyclic pulse generator 40 having outputs 41' to 49' for firing the corresponding controllable rectifiers 41 to 49.

Connected across each controllable rectifier 41 to 49 is a series circuit comprising a condenser and a winding of an inductor 70. The controllable rectifier 41 is connected with the inductor winding 61 and capacitor 51 and corresponding inductor windings 62 to 69 with capacitors 52 to 59 connected with the other controllable rectifiers 42 to 49.

The output from the rectifier bridges is taken to the three-phase output lines $a$, $b$ and $c$ shown as connected to a load 74, the rectifier bridges 31, 34 and 37 supplying phase line $c$, the rectifier bridges 32, 35 and 38 the phase line $b$ and the rectifier bridges 33, 36 and 39 the phase line $a$.

The cyclic pulse generator 40 operates cyclically to fire the controllable rectifiers 41, 45 and 49 simultaneously and at a predetermined frequency Q, it then fires the controllable rectifiers 42, 46 and 47 at the same frequency and thereafter fires the controllable rectifiers 43, 44 and 48 also at the frequency Q so that each group of the three controllable rectifiers is rendered conductive for substantially 120° of the frequency Q.

Firing of the controllable rectifiers thus allows the associated rectifier bridges to connect the input phases to the output phases in the following order:

Input phases A, B, C to output phases $a$, $b$, $c$,
The input phases A, B, C to the output phases $c$, $a$, $b$, and
The input phases A, B, C to the output phases $b$, $c$, $a$.

Thus if the input phase A, B, C has a frequency P the frequency of the output phase circuit $a$, $b$, $c$ will be Q−P.

The controllable rectifiers 41 to 49 will only cease conducting when the voltage applied thereto falls to zero or reverses and in order to ensure that these rectifiers are rendered non-conducting the inductor 70 and the capacitors 51 to 59 are provided. At any time when any one controllable rectifier is not conducting the associated capacitor 51 to 59 will become charged so that when the associated controllable rectifier is rendered conductive the capacitor will discharge through that controllable rectifier inducing a voltage into the other windings of the inductor which voltage will then be applied to the previously fired and still conducting controllable rectifiers in such direction as to render them non-conducting.

As previously stated the controllable rectifiers are fired in the order 41, 45 and 49, 42, 46 and 47, and 43, 44 and 48 so that firing of rectifiers 42, 46 and 47 will render rectifiers 41, 45 and 49 non-conductive whilst rectifiers 42, 46 and 47 will be rendered non-conductive when the rectifiers 43, 44 and 48 are fired and these rectifiers in turn rendered non-conductive by the next firing of the rectifiers 41, 45 and 49.

In order to prevent the reverse voltage induced into the inductor from reaching an excessive value the inductor has a damping winding 71 across which there is connected a damping circuit comprising a diode 72 and a zener diode 73 which is chosen so as to conduct if the induced voltage exceeds a predetermined value, thus damping the action of the inductor. However, any other suitable form of damping circuit could be employed.

What I claim as my invention and desire to secure by Letters Patent is:

1. A frequency changer for providing an alternating current output from a polyphase alternating current source comprising, for each output phase of the frequency changer, a pair of series-connected controllable rectifiers for each phase of the polyphase source, means for connecting the connection point between each pair of controllable rectifiers to a corresponding phase of the alternating current source, means operatively associated with the controllable rectifiers for cyclically rendering them temporarily conductive in a predetermined order and at a predetermined frequency, inductor means, means for connecting each pair of controllable rectifiers in an associated bridge circuit each of which includes a pair of the controllable rectifiers in adjacent arms of the bridge circuit and the inductor means in the other two arms thereof, and capacitor means connected in each bridge circuit between the junction of the pair of controllable rectifiers and the junction of the two adjacent inductive arms of the bridge.

2. A frequency changer according to claim 1 in which the controllable rectifiers are silicon controlled rectifiers.

3. A frequency changer according to claim 1 including a filter for filtering out unwanted harmonics from the output of the frequency changer.

4. A frequency changer according to claim 1 in which the inductor means is common to each bridge circuit.

5. A frequency changer for providing a single phase alternating current output from a star connected polyphase alternating current source comprising, a pair of series-connected controllable rectifiers for each phase of the polyphase source, means for connecting the connection point between each pair of controllable rectifiers to a corresponding phase of the polyphase alternating current source, a centre tapped inductor, means for connecting one outer end of the inductor to one side of one of each said pair of controllable rectifiers, means for connecting the other outer end of the inductor to one side of the other one of each said pair of controllable rectifiers, a capacitor connected between the connection point between each pair of controllable rectifiers and the centre tap of the inductor, and a cyclically operating pulse generator operatively associated with the controllable rectifiers for cyclically rendering them temporarily conductive in a predetermined order and at a predetermined frequency whereby a load connected between the star point of said polyphase alternating current source and the centre tap of said inductor will be supplied with a single phase alternating current output of said predetermined frequency.

6. A frequency changer according to claim 5 in which the controllable rectifiers are silicon controlled rectifiers.

7. A frequency changer according to claim 5 including a filter for filtering out unwanted harmonics from the output of the frequency changer.

8. A frequency changer for providing a polyphase alternating current output from a polyphase source comprising, for each phase of the polyphase source, a rectifier bridge for each output phase of the frequency changer, each such bridge having a controllable rectifier connected between first and second diagonally opposite junctions of two arms thereof, means for connecting a third junction of the arms of each rectifier bridge to a corresponding phase of the polyphase alternating current source, means for connecting a fourth junction of the arms of each of the rectifier bridges of the frequency changer to a corresponding output phase line of the frequency changer, an inductor having a winding for each rectifier bridge of the frequency changer, each such winding being connected across the said first and second diagonally opposite junctions of its associated bridge in series with a capacitor, and means operatively associated with each of the controllable rectifiers of the rectifier bridges of the frequency changer for cyclically rendering them temporarily conductive so that conduction takes place through the rectifier bridges in an order which temporarily allows current to flow from each phase of the polyphase source to each of the output phase lines of the frequency changer thereby to provide a polyphase alternating current output at the said output phase lines.

9. A frequency changer according to claim 8 in which the controllable rectifiers are silicon controlled rectifiers.

10. A frequency changer according to claim 8 including a filter for filtering out unwanted harmonics from the output of the frequency changer.

11. A frequency changer according to claim 8 in which the inductor includes an additional winding and a damping circuit connected across the said additional winding.

References Cited by the Examiner
UNITED STATES PATENTS

| | | |
|---|---|---|
| 3,049,642 | 8/1962 | Quinn. |
| 3,170,107 | 2/1965 | Jessee _____ 321—61 |
| 3,178,630 | 4/1965 | Jessee _____ 321—7 |

FOREIGN PATENTS 645,950  11/1950  Great Britain.

JOHN F. COUCH, *Primary Examiner.*

W. H. BEHA, *Assistant Examiner.*